(12) United States Patent
Fu et al.

(10) Patent No.: US 9,942,571 B2
(45) Date of Patent: Apr. 10, 2018

(54) METHOD AND APPARATUS FOR CODING OF SAMPLE ADAPTIVE OFFSET INFORMATION

(71) Applicant: HFI Innovation Inc., Zhubei, Hsinchu County (TW)

(72) Inventors: Chih-Ming Fu, Hsinchu (TW);
Yu-Wen Huang, Taipei (TW);
Chih-Wei Hsu, Taipei (TW);
Shaw-Min Lei, Hsinchu County (TW)

(73) Assignee: HFI INNOVATIONS INC., Zhubei (TW)

(*) Notice: Subject to any disclaimer, the term of this patent is extended or adjusted under 35 U.S.C. 154(b) by 275 days.

(21) Appl. No.: 14/403,186

(22) PCT Filed: Apr. 2, 2013

(86) PCT No.: PCT/CN2013/073627
§ 371 (c)(1),
(2) Date: Nov. 23, 2014

(87) PCT Pub. No.: WO2013/177975
PCT Pub. Date: Dec. 5, 2013

(65) Prior Publication Data
US 2015/0098513 A1  Apr. 9, 2015

Related U.S. Application Data

(60) Provisional application No. 61/652,564, filed on May 29, 2012, provisional application No. 61/662,967, filed on Jun. 22, 2012.

(51) Int. Cl.
*H04N 7/12* (2006.01)
*H04N 19/70* (2014.01)
(Continued)

(52) U.S. Cl.
CPC ............. *H04N 19/70* (2014.11); *H04N 19/13* (2014.11); *H04N 19/44* (2014.11); *H04N 19/91* (2014.11); *H04N 19/86* (2014.11)

(58) Field of Classification Search
CPC ...................................................... H04N 19/70
See application file for complete search history.

(56) References Cited

U.S. PATENT DOCUMENTS

| | | | |
|---|---|---|---|
| 2010/0097248 | A1 | 4/2010 | Sze et al. |
| 2011/0248871 | A1 | 10/2011 | Kim et al. |

(Continued)

FOREIGN PATENT DOCUMENTS

| | | |
|---|---|---|
| CN | 102231830 A | 11/2011 |
| EP | 2 858 355 | 4/2015 |

(Continued)

OTHER PUBLICATIONS

Osorio, R.R., et al.; "High-Throughput Architecture for H.264AVC CABAC Compression System;" IEEE Transactions on Circuits and Systems for Video Technology; vol. 16; No. 11; Nov. 2006; pp. 1376-1384.

(Continued)

*Primary Examiner* — Tracy Y Li
(74) *Attorney, Agent, or Firm* — Oblon, McClelland, Maier & Neustadt, L.L.P.

(57) ABSTRACT

A method and apparatus for sharing context among different SAO syntax elements for a video coder are disclosed. Embodiments of the present invention apply CABAC coding to multiple SAO syntax elements according to a joint context model, wherein the multiple SAO syntax elements share the joint context. The multiple SAO syntax elements may correspond to SAO merge left flag and SAO merge up flag. The multiple SAO syntax elements may correspond to SAO merge left flags or merge up flags associated with (Continued)

different color components. The joint context model can be derived based on joint statistics of the multiple SAO syntax elements. Embodiments of the present invention code the SAO type index using truncated unary binarization, using CABAC with only one context, or using CABAC with context mode for the first bin associated with the SAO type index and with bypass mode for any remaining bin.

8 Claims, 7 Drawing Sheets

(51) Int. Cl.
*H04N 19/91* (2014.01)
*H04N 19/44* (2014.01)
*H04N 19/13* (2014.01)
*H04N 19/86* (2014.01)

(56) References Cited

U.S. PATENT DOCUMENTS

| 2012/0082232 A1* | 4/2012 | Sole Rojals | H04N 19/176 |
| | | | 375/240.18 |
| 2013/0322518 A1 | 12/2013 | Terada et al. | |
| 2014/0126630 A1* | 5/2014 | Park | H04N 19/13 |
| | | | 375/240.02 |
| 2015/0030085 A1 | 1/2015 | Terada et al. | |
| 2015/0365665 A1 | 12/2015 | Terada et al. | |

FOREIGN PATENT DOCUMENTS

| KR | 10-2009-0064388 | 6/2009 |
| KR | 20100114776 A | 10/2010 |
| WO | 2012045269 A1 | 4/2012 |
| WO | WO 2013/175698 | 11/2013 |
| WO | WO 2013/175756 | 11/2013 |

OTHER PUBLICATIONS

Hsu, C.W., et al.; "Non-CE1 Decoupling SAO onoff from SAO type with neighbor-based contexts;" Joint Collaborative Team on Video Coding (JCT-VC) of ITU-T SG15 WP3 and ISO/IEC JTC1/SC29/WG11; May 2012; pp. 1-6.

Sze, V., et al.; "Reduction in contexts used for significant_coeff_flag and coefficient level;" Joint Collaborative Team on Video Coding (JCT-VC) of ITU-T SG15 WP3 and ISO/IEC JTC1/SC29/WG11; Jul. 2011; pp. 1-4.

U.S. Appl. No. 61/651,719, filed May 25, 2012.

Fu., C.M., et al.; "Sample Adaptive Offset with LCU-based Syntax;" Joint Collaborative Team on Video Coding (JCT-VC) of ITU-T SG16 WP3 and ISO/IEC JTC1/SC29/WG11; Jul. 2011; pp. 1-6.

Bross, B., et al.; "High efficiency video coding (HEVC) text specification draft 7;" Joint Collaborative Team on Video Coding (JCT-VC) of ITU-T SG16 WP3 and ISO/IEC JTC1/SC29/WG11; Apr.-May 2012; pp. 1-5.

Seregin, V., et al.; "Utilisation of CABAC equal probability mode for intra modes coding;" Joint Collaborative Team on Video Coding (JCT-VC) of ITU-T SG16 WP3 and ISO/IEC JTC1/SC29/WG11; Jul. 2011; pp. 1-4.

Maani, E., et al.; "SAO Type Coding Simplification;" Joint Collaborative Team on Video Coding (JCT-VC) of ITU-T SG 16 WP 3 and ISO/IEC JTC 1/SC 29/WG 11; Apr.-May 2012; pp. 1-3.

Minezawa, A., et al.; "Non-CE1: Improved edge offset coding for SAO;" Joint Collaborative Team on Video Coding (JCT-VC) of ITU-T SG 16 WP 3 and ISO/IEC JTC 1/SC 29/WG 11; Apr.-May 2012; pp. 1-11.

Bici, O., et al.; "Context reduction for merge index coding;" Joint Collaborative Team on Video Coding (JCT-VC) of ITU-T SG 16 WP 3 and ISO/IEC JTC 1/SC 29/WG 11; Feb. 2012; pp. 1-4.

Chong, I. S. et al.; "AHG6/AHG5: Fix and simplification for SAO type index;" Joint Collaborative Team on Video Coding (JCT-VC) of ITU-T SG 16 WP 3 and ISO/IEC JCT 1/SC 29/WG 11; Jul. 2012; pp. 1-4.

* cited by examiner

METHOD AND APPARATUS FOR CODING OF SAMPLE ADAPTIVE OFFSET INFORMATION

CROSS REFERENCE TO RELATED APPLICATIONS

The present invention claims priority to U.S. Provisional Patent Application No. 61/652,564, filed on May 29, 2012, entitled "The context design of SAO syntax" and U.S. Provisional Patent Application No. 61/662,967, filed on Jun. 22, 2012, entitled "Reduction of Context Models and Context Bins for SAO". The U.S. Provisional Patent Applications are hereby incorporated by reference in their entireties.

BACKGROUND OF THE INVENTION

Field of the Invention

The present invention relates to video coding. In particular, the present invention relates to coding of Sample Adaptive Offset (SAO) information.

Description of the Related Art

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing can be applied to reconstructed video to enhance picture quality in newer coding systems. The additional processing is often configured in an in-loop operation so that the encoder and the decoder may derive the same reference pictures.

Figure 1:
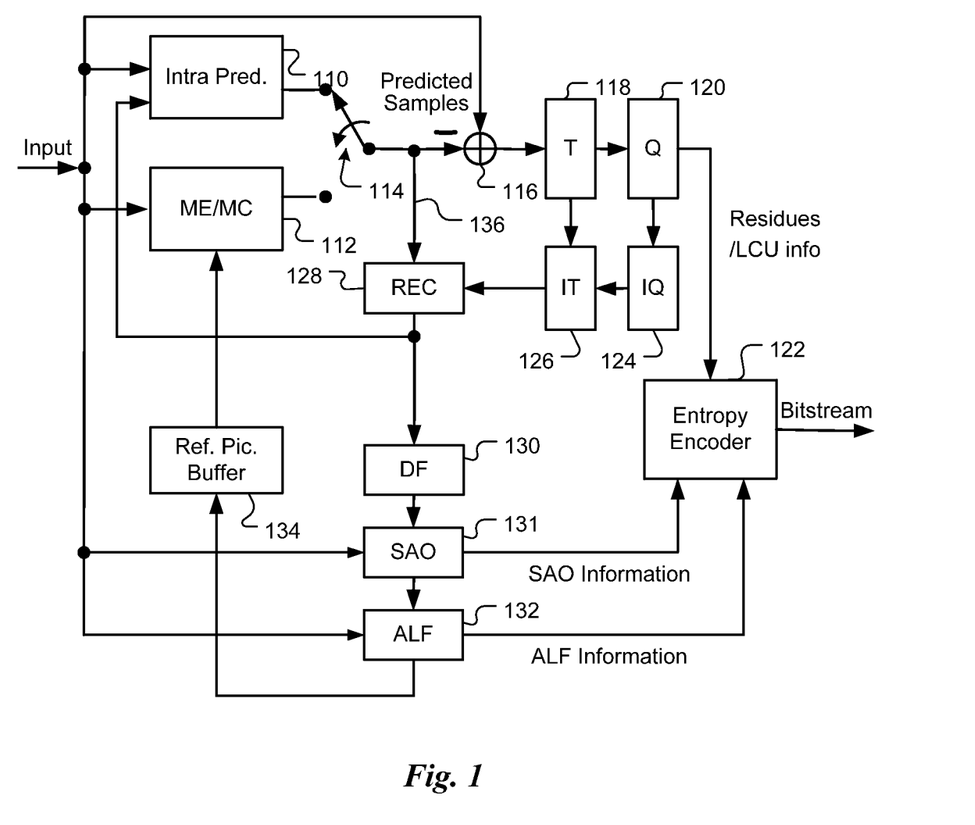
FIG. 1 illustrates an exemplary video coding system using Inter/Intra prediction, where loop filter processing, including Deblocking Filter (DF), Sample Adaptive Offset (SAO) and Adaptive Loop Filter (ALF) is incorporated.

FIG. 1 illustrates an exemplary adaptive inter/intra video coding system incorporating in-loop filtering process. For inter-prediction, Motion Estimation (ME)/Motion Compensation (MC) 112 is used to provide prediction data based on video data from other picture or pictures. Switch 114 selects Intra Prediction 110 or inter-prediction data from ME/MC 112 and the selected prediction data is supplied to Adder 116 to form prediction errors, also called prediction residues or residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image unit. The side information may also be processed by entropy coding to reduce required bandwidth. Accordingly, the side information data is also provided to Entropy Encoder 122 as shown in FIG. 1 (the motion/mode paths to Entropy Encoder 122 are not shown). When the inter-prediction mode is used, a previously reconstructed reference picture or pictures have to be used to form prediction residues. Therefore, a reconstruction loop is used to generate reconstructed pictures at the encoder end. Consequently, the transformed and quantized residues are processed by Inverse Quantization (IQ) 124 and Inverse Transformation (IT) 126 to recover the processed residues. The processed residues are then added back to prediction data 136 by Reconstruction (REC) 128 to reconstruct the video data. The reconstructed video data is stored in Reference Picture Buffer 134 and be used for prediction of other frames.

As shown in FIG. 1, incoming video data undergoes a series of processing in the encoding system. The reconstructed video data from REC 128 may be subject to various impairments due to the series of processing. Accordingly, various loop processing is applied to the reconstructed video data before the reconstructed video data is used as prediction data in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The Deblocking Filter (DF) 130 is applied to boundary pixels and the DF processing is dependent on the underlying pixel data and coding information associated with the corresponding blocks. There is no DF-specific side information needs to be incorporated in the video bitstream. On the other hand, the SAO and ALF processing are adaptive, where filter information such as filter parameters and filter type may be dynamically changed according to the underlying video data. Therefore, filter information associated with SAO and ALF is incorporated in the video bitstream so that a decoder can properly recover the required information. Furthermore, filter information from SAO and ALF is provided to Entropy Encoder 122 for incorporation into the bitstream. In FIG. 1, DF 130 is applied to the reconstructed video first; SAO 131 is then applied to DF-processed video; and ALF 132 is applied to SAO-processed video. However, the processing order among DF, SAO and ALF may be re-arranged. In the High Efficiency Video Coding (HEVC) video standard being developed, the loop filtering process includes DF and SAO.

The coding process in HEVC is applied to each Largest Coding Unit (LCU). The LCU is adaptively partitioned into coding units using quadtree. Therefore, the LCU is also called coding tree block (CTB). In each leaf CU, DF is performed for each 8×8 block and in HEVC Test Model Version 7.0 (HM-7.0), DF is applied to the 8×8 block boundaries. For each 8×8 block, horizontal filtering across vertical block boundaries is first applied, and then vertical filtering across horizontal block boundaries is applied.

Figure 2:
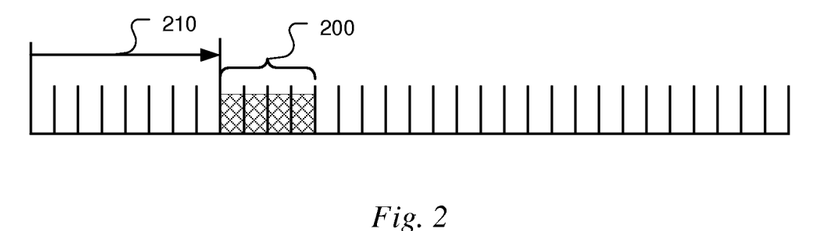
FIG. 2 illustrates an example of Band Offset (BO) by equally dividing the pixel intensity range into 32 bands.
Figure 3:
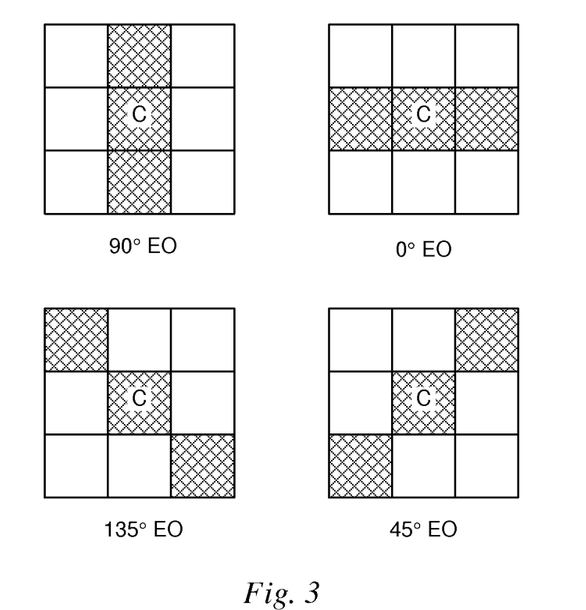
FIG. 3 illustrates Edge Offset (EO) pixel classification based on a 3×3 window, with four configurations corresponding to 0°, 90°, 135°, and 45°.

Sample Adaptive Offset (SAO) 131 is also adopted in HM-7.0, as shown in FIG. 1. SAO is regarded as a special case of filtering where the processing only applies to one pixel. To apply SAO, a picture may be divided into multiple LCU-aligned regions. Each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands, as shown in FIG. 2. Four consecutive bands are grouped together, where the starting band is indicated by sao_band_position. An exemplary 4-band group 200 is illustrated in FIG. 2. The first band position of this 4-band group is indicated by arrow 210. In EO, pixel classification is first done to classify pixels into different groups (also called categories or classes). The pixel classification for each pixel is based on a 3×3 window, as shown in FIG. 3 where four configurations corresponding to 0°, 90°, 135°, and 45° are used for classification. Upon classification of all pixels in a picture or a region, one offset is derived and transmitted for each group of pixels. In HM-7.0, SAO is applied to luma and chroma components, and each of the luma components is independently processed. Similar to BO, one offset is derived for all pixels of each category except for category 4 of EO, where Category 4 is forced to use zero offset. Table 1 below lists the EO pixel classification, where "C" denotes the pixel to be classified.

TABLE 1

| Category | Condition |
|---|---|
| 0 | C < two neighbors |
| 1 | C < one neighbor && C == one neighbor |
| 2 | C > one neighbor && C == one neighbor |
| 3 | C > two neighbors |
| 4 | None of the above |

Adaptive Loop Filtering (ALF) 132 is another in-loop filtering in HM-7.0 to enhance picture quality, as shown in FIG. 1. Multiple types of luma filter footprints and chroma filter footprints are used. The ALF operation is applied in the horizontal direction first. After horizontal ALF is performed, ALF is applied in the vertical direction. In HM-7.0, up to sixteen luma ALF filters and at most one chroma ALF filter can be used for each picture. In order to allow localization of ALF, there are two modes for luma pixels to select filters. One is a Region-based Adaptation (RA) mode, and the other is a Block-based Adaptation (BA) mode. In addition to the RA and BA for adaptation mode selection at picture level, Coding Units (CUs) larger than a threshold can be further controlled by filter usage flags to enable or disable ALF operations locally. As for the chroma components, since they are relatively flat, no local adaptation is used in HM-7.0, and the two chroma components of a picture share the same filter. In MH-7.0, an ALF filter for a region may be selected from multiple ALF filters. In addition, multiple filter footprints are used in HM-7.0. For each ALF filter, there is a set of filter coefficients associated with the filter. Therefore, the ALF information comprises identification for the selected ALF filter, the filter footprint and filter coefficients.

As shown in FIG. 1, DF 130 is applied to reconstructed pixels from REC 128. SAO 131 is then applied to DF-processed pixels and ALF 132 is applied to SAO-processed pixels. While the processing sequence illustrated in FIG. 1 is DF, SAO and ALF, other processing sequence may also be used. For example, SAO may be applied to reconstructed pixels from REC 128, DF-processed reconstructed pixels (i.e., DF applied to reconstructed pixels), ALF-processed reconstructed pixels (i.e., ALF applied to reconstructed pixels), both DF-processed and ALF-processed pixels (i.e., DF applied to reconstructed pixels and ALF applied to DF-processed reconstructed pixels) or both ALF-processed and DF-processed pixels (i.e., ALF applied to reconstructed pixels and DF applied to ALF-processed reconstructed pixels). For convenience, the "processed-reconstructed pixels" may refer to any type of the processed pixels mentioned above during SAO processing. The "processed-reconstructed pixels" also includes reconstructed pixels from REC 128. In this case, it can be considered that a null processing is applied to reconstructed pixels from REC 128. Similarly, the "processed-reconstructed pixels" may also refer to various types of the processed pixels by DF, SAO, both DF and SAO or both SAO and DF during ALF processing. Again, for ALF processing, the "processed-reconstructed pixels" also includes reconstructed pixels from REC 128.

To reduce side-information associated with SAO processing, SAO information of a current LCU can reuse the SAO information of a neighboring LCU above or to the left of the current LCU. The SAO information sharing is indicated by merge syntax. In HM-8.0, SAO syntax consists of sao_merge_left_flag, sao_merge_up_flag, sao_type_idx_luma, sao_type_index_chroma, sao_eo_class_luma, sao_eo_class_chroma, sao_band_position, sao_offset_abs, and sao_offset_sign, as shown in Table 2. Syntax sao_merge_left_flag indicates whether the current LCU reuses the SAO parameters of the left LCU. Syntax sao_merge_up_flag indicates whether the current LCU reuses the SAO parameters of the upper LCU. Syntax sao_type_idx represents the selected SAO type (sao_type_idx_luma and sao_type_idx_chroma for luma component and chroma component respectively). In HM-8.0, each LCU can select no processing (SAO-off) or apply one of SAO types including BO and EO as shown in Table 3. Note that the SAO types 0-degree EO, 90-degree EO, 135-degree EO, and 45-degree EO are indicated by the SAO syntaxes sao_eo_class_luma and sao_eo_class_chroma. Syntax sao_offset_abs represents the offset magnitude and syntax sao_offset_sign represents the offset sign. Syntax cIdx indicates one of three color components. Similar mechanism can also be used to allow neighboring blocks to share the same ALF information. Note that the syntax representation difference between HM-7.0 and HM-8.0 do not affect the entropy coding method.

Figure 4:
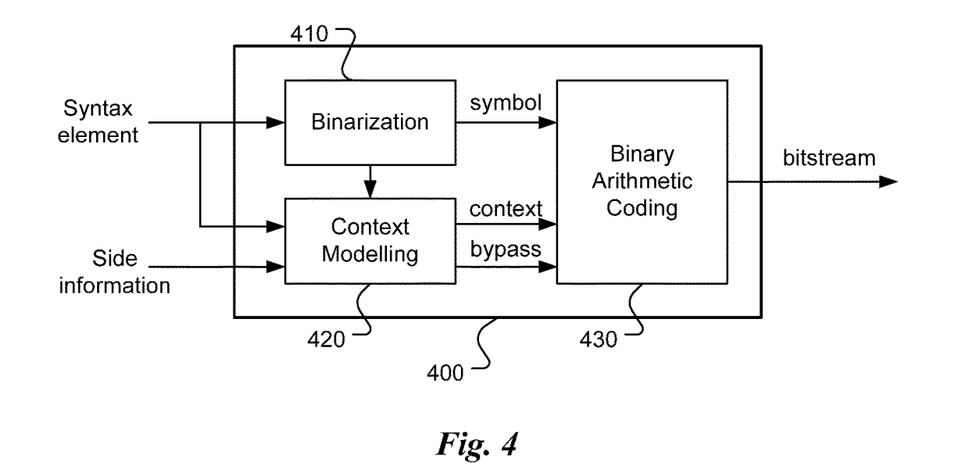
FIG. 4 illustrates an exemplary structure of context-based adaptive binary arithmetic coding (CABAC).

In HM-7.0, context-based adaptive binary arithmetic coding (CABAC) is used as the entropy coder to code SAO information. The CABAC process 400 consists of binarization, context modeling, and binary arithmetic coding (BAC) as shown in FIG. 4. In the binarization step 410, each syntax element is mapped into a binary string (also called bin or bins in this disclosure). In the context modeling step 420, a probability model is selected for each bin. The corresponding probability model may depend on previously encoded syntax elements, bin indices, side information, or any combination of the above. After the binarization and the context model assignment, a bin value along with its associated context model is provided to the binary arithmetic coding engine 430, i.e., the BAC. The bin value can be coded in two coding modes depending on the syntax element and bin indices, where one is the regular coding mode, and the other is the bypass mode. The bins corresponding to the regular coding mode are referred to as regular bins and the bins corresponding to the bypass coding mode are referred to as bypass bins in this disclosure. In the regular coding mode, the probability of the Most Probable Symbol (MPS) and the probability of the Least Probable Symbol (LPS) for BAC are derived from the associated context model. In the bypass coding mode, the probability of the MPS and the LPS are considered equal. In CABAC, the bypass mode is introduced to speed up the encoding process. For compression-efficient CABAC design, it is important to form good syntax binarization and suitable context models. The context model design has to match the statistics of the underlying data, which may cause high processing complexity. It is desirable to reduce the complexity of the context model associated with SAO information while maintaining the compression efficiency of CABAC.

TABLE 2

| | Descriptor |
|---|---|
| sao( rx, ry ){ | |
|   if( rx > 0 ) { | |
|     leftCtbInSlice = CtbAddrInSlice > 0 | |
|     leftCtbInTile = TileId[ CtbAddrTS ] = = TileId[ CtbAddrRStoTS[ CtbAddrRS − 1 ] ] | |

TABLE 2-continued

| | Descriptor |
|---|---|
| if( leftCtbInSlice && leftCtbInTile )     sao_merge_left_flag | ae(v) |
| } | |
| if( ry > 0 && !sao merge left flag ) {     upCtbInSlice = (CtbAddrTS −        CtbAddrRStoTS[CtbAddrRS − PicWidthInCtbs]) <=              CtbAddrInSlice     upCtbInTile = TileId[ CtbAddrTS ] = =              TileId[ CtbAddrRStoTS[                 CtbAddrRS −                 PicWidthInCtbs ] ]     if( upCtbInSlice && upCtbInTile )        sao_merge_up_flag | ae(v) |
| } | |
| if( !sao merge up flag && !sao merge left flag ) {     for( cIdx = 0; cIdx < 3; cIdx++ ) {        if( ( slice_sao_luma_flag && cIdx = = 0 ) \|\|            ( slice_sao_chroma_flag && cIdx > 0 ) ) {           if( cIdx = = 0 )              sao_type_idx_luma | ae(v) |
|           if( cIdx = = 1 )              sao_type_idx_chroma | ae(v) |
|           if( SaoTypeIdx[ cIdx ][ rx ][ ry ] != 0 ) {              for( i = 0; i < 4; i++ )                 sao_offset_abs[ cIdx ][ rx ][ ry ][ i ] | ae(v) |
|              if( SaoTypeIdx[ cIdx ][ rx ][ ry ] == 1 ) {                 for( i = 0; i < 4; i++ ) {                    if( sao offset abs[ cIdx ][ rx ][ ry                       ][ i ] != 0 )                       sao_offset_sign[ cIdx ][ rx                          ][ ry ][ i ] | ae(v) |
|                    sao_band_position[ cIdx ][ rx ][ ry ] | ae(v) |
|              } else {                 if( cIdx = = 0 )                    sao_eo_class_luma | ae(v) |
|                 if( cIdx = = 1 )                    sao_eo_class_chroma | ae(v) |
|              }           }        }     } } | |

TABLE 3

| sao_type_idx_luma sao_type_idx_chroma | SAO type |
|---|---|
| 0 | Not applied |
| 1 | BO |
| 2 | EO |

BRIEF SUMMARY OF THE INVENTION

A method and apparatus for sharing context among different SAO syntax elements for a video coding system are disclosed. Embodiments according to the present invention apply CABAC encoding or decoding to multiple SAO syntax elements according to a joint context model, wherein the multiple SAO syntax elements share the joint context. The multiple SAO syntax elements may correspond to SAO merge left flag and SAO merge up flag. The multiple SAO syntax elements may also correspond to SAO merge left flags or merge up flags associated with different color components. The joint context model can be derived based on joint statistics of the multiple SAO syntax elements.

A method and apparatus for simplifying SAO type index coding for a video coding system are disclosed. Embodiments according to the present invention encode the SAO type index using truncated unary binarization, using CABAC with only one context, or using CABAC with a context mode for the first bin associated with the SAO type index and with a bypass mode for any remaining bin. The SAO type index corresponds to a first SAO type index associated with the luma component of the video data or a second SAO type index associated with the chroma component of the video data.

DETAILED DESCRIPTION OF THE INVENTION

As mentioned before, the use of merge flag (e.g., sao_merge_left_flag and sao_merge_up_flag) allows neighboring blocks to share SAO information to reduce required SAO information. In HM-7.0, syntax elements sao_merge_left_flag and sao_merge_up_flag are coded using CABAC. The context model for the underlying symbol is formed based on the probability model of the symbol. In HM-7.0, the context model is formed separately for sao_merge_left_flag and sao_merge_up_flag. Furthermore, context model is formed separately for different color components (i.e. Y, Cb, Cr).

Embodiments according to the present invention allow different syntax elements associated with merge flags to share a same context model. For example, the merge left flag and merge up flag (i.e., sao_merge_left_flag and sao_merge_up_flag) of a color component can share the same context model. In this case, the context model can be designed according to the combined or joint statistics of the merge left flag and merge up flag. The combined statistics is likely different from individual statistics associated with the merge left flag and merge up flag. Therefore, the combined context model is likely different from the individual context model associated with the merge left flag and the merge up flag. In another example, the merge left flags for different color components share the same context model. In this case, the context model associated with the left merge flag is designed based on combined statistics for the different color components. In yet another embodiment, the merge up flags for different color components share the same context model. In this case, the context model associated with the merge up flag is designed based on combined statistics for the different color components.

In HM-7.0, the syntax elements associated with SAO type indexes (e.g., sao_type_idx_luma and sao_type_idx_chroma) are coded using CABAC. After binarization, the bit strings associated with SAO type indexes are processed by CABAC. In order to reduce the complexity, in one embodiment, coding of SAO type indexes is based on a truncated unary binarization method. For example, the SAO type index (including luma and chroma) as shown in Table 3 may be represented by a truncated unary code set {0, 10, 11} for indexes 0 through 3 respectively. In another embodiment, CABAC for SAO type indexes uses only one context. In yet another embodiment, CABAC for SAO type indexes uses context coding for the first bin and uses bypass coding for the rest of the bins. For example, the binarization of the SAO type index may correspond to {0, 10, 11} and only the first bit of each SAO type index is coded using context coding. The remaining bit(s) is/are coded using bypass mode.

Figure 5:
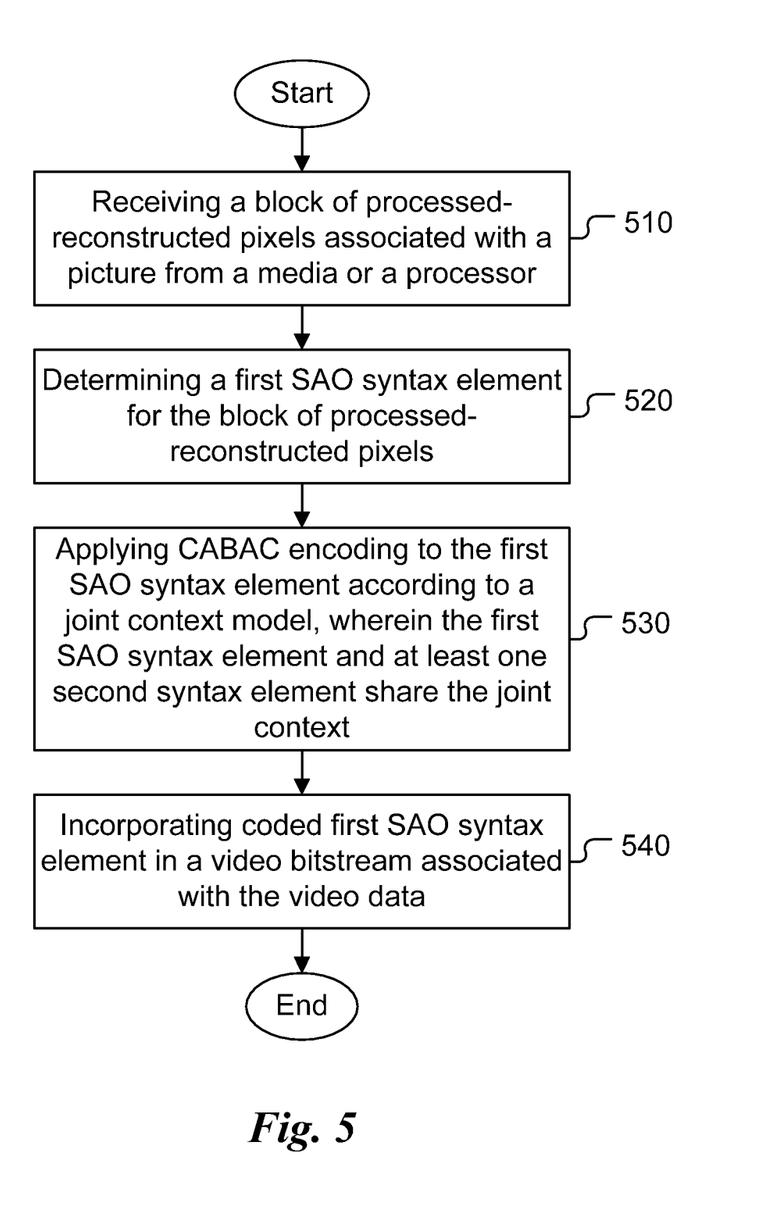
FIG. 5 illustrates an exemplary flowchart of SAO processing with context sharing among different SAO syntax elements for a video encoder incorporating an embodiment of the present invention.

FIG. 5 illustrates an exemplary flowchart of SAO processing with context sharing among different SAO syntax elements for a video coding system incorporating an embodiment of the present invention. As shown in FIG. 1 and described in the associated text, loop processing (DF, SAO or ALF) is applied to reconstructed pixels. Furthermore, as mentioned before, the processed-reconstructed pixels may refer to various types of processed reconstructed pixels. A current block of processed-reconstructed pixels is received from a media or a processor as shown in step 510. The processed-reconstructed pixels may be stored in a media such as a RAM or DRAM in a system. Therefore, the processed-reconstructed pixels will have to be read back from a media. Also it is possible that SAO processing receives processed-reconstructed pixels directly from another processor (such as a central processing unit, a controller or a digital signal processor) responsible to generate the processed-reconstructed pixels. In this case, the processed-reconstructed pixels will be received from a processor. The block can be a coding tree block (CTB), an LCU or other block unit (such as macroblock or other types). An SAO syntax element (named a first SAO syntax element) for the block of processed-reconstructed pixels is determined in step 520. The first SAO syntax element may correspond to an SAO merge flag or other syntax element related to SAO processing. The determination of the SAO syntax element for the block is known in the art. For example, the merge flag may be determined using rate-distortion optimization at the encoder side. CABAC encoding is then applied to the first SAO syntax element according to a joint context model as shown in step 530, wherein the first SAO syntax element and at least one second syntax element share the joint context. The joint context model may be formed according to joint statistics of the first SAO syntax element and said at least one second syntax element. The coded first SAO syntax element is incorporated in a video bitstream associated with the video data as shown in step 540 so that a decoder will be able to recover the first SAO syntax element from the bitstream.

Figure 6:
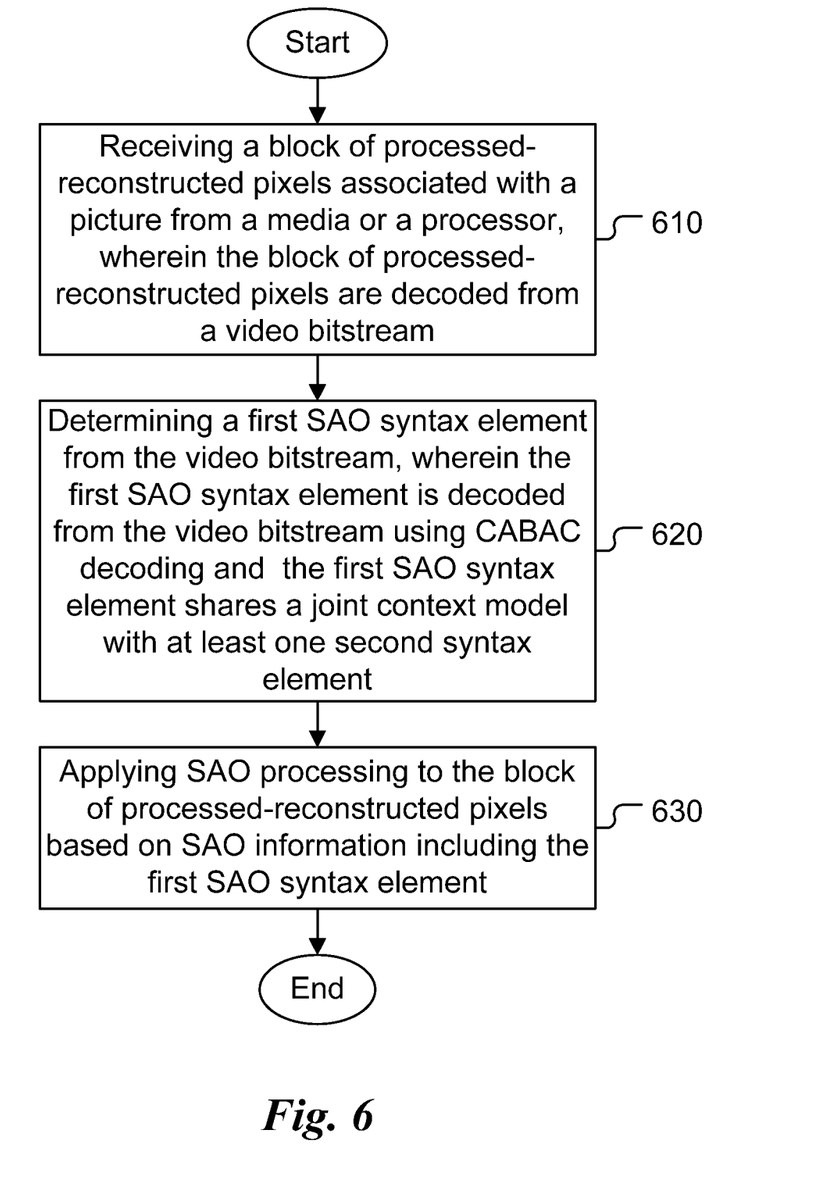
FIG. 6 illustrates an exemplary flowchart of SAO processing with context sharing among different SAO syntax elements for a video decoder incorporating an embodiment of the present invention.

FIG. 6 illustrates an exemplary flowchart of SAO processing with context sharing among different SAO syntax elements for a video decoder incorporating an embodiment of the present invention. A block of processed-reconstructed pixels associated with a picture is received from a media or a processor as shown in step 610, wherein the block of processed-reconstructed pixels are decoded from a video bitstream. The SAO syntax element (named first SAO syntax element) from the video bitstream is determined as shown in step 620, wherein the first SAO syntax element is decoded from the video bitstream using CABAC decoding and the first SAO syntax element shares a joint context model with at least one second syntax element. Determining the SAO syntax element may correspond to decoding the SAO syntax element if the SAO syntax element is not yet decoded. Method to decode a syntax element from a bitstream is known in the art. Determining the SAO syntax element may also correspond to receiving the SAO syntax element if the SAO syntax element is decoded by an entropy decoder that is not part of the SAO processing. After the first SAO syntax element is recovered, SAO processing can be applied to the block of processed-reconstructed pixels based on SAO information including the first SAO syntax element as shown in step 630.

Figure 7:
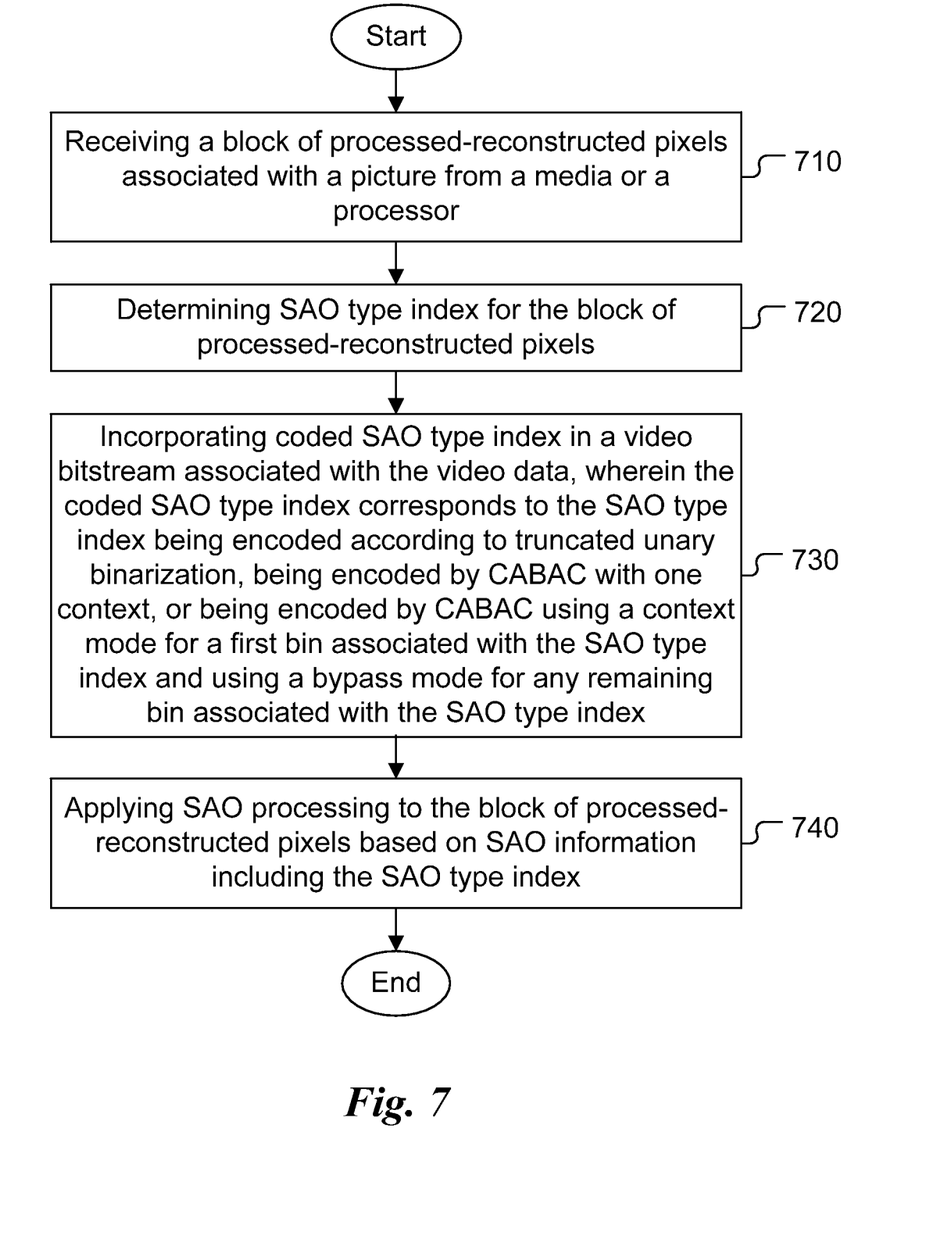
FIG. 7 illustrates an exemplary flowchart of SAO processing with complexity-reduced SAO type index coding for a video encoder incorporating an embodiment of the present invention.

FIG. 7 illustrates an exemplary flowchart of SAO processing with complexity-reduced SAO type index coding for a video encoder incorporating an embodiment of the present invention. A current block of processed-reconstructed pixels is received from a media or a processor as shown in step 710. The processed-reconstructed pixels may be stored in a media such as a RAM or DRAM in a system. Therefore, the processed-reconstructed pixels will have to be read back from a media. Also it is possible that the SAO processing receives processed-reconstructed pixels directly from another processor (such as a central processing unit, a controller or a digital signal processor) responsible to generate the processed-reconstructed pixels. In this case, the processed-reconstructed pixels will be received from a processor. The block can be a coding tree block (CTB), an LCU or other block unit (such as macroblock or other types). An SAO type index for the block of processed-reconstructed pixels is determined in step 720. The determination of the SAO type index for the block is known in the art. For example, the SAO type index may be determined using rate-distortion optimization at the encoder side. The SAO type index is then coded and incorporated in the video bitstream as shown in step 730 so that the SAO type index can be recovered at the decoder side. The coded SAO type index corresponds to the SAO type index being encoded according to truncated unary binarization, being encoded by CABAC with one context, or being encoded by CABAC using a context mode for a first bin associated with the SAO type index and using a bypass mode for any remaining bin associated with the SAO type index. The SAO processing is applied to the block of processed-reconstructed pixels based on SAO information including the SAO type index as shown in step 740.

Figure 8:
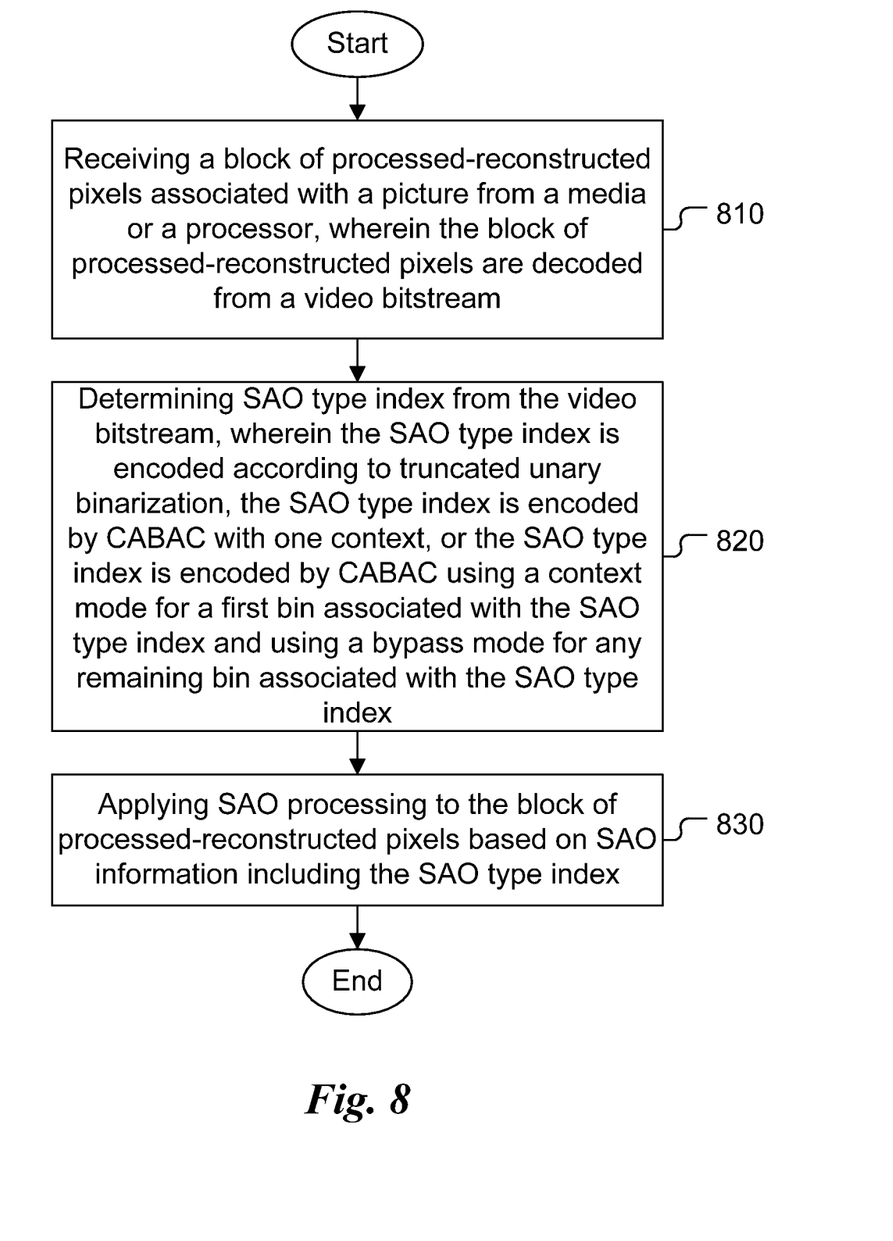
FIG. 8 illustrates an exemplary flowchart of SAO processing with complexity-reduced SAO type index coding for a video decoder incorporating an embodiment of the present invention.

FIG. 8 illustrates an exemplary flowchart of SAO processing with complexity-reduced SAO type index coding for a video decoder incorporating an embodiment of the present invention. A block of processed-reconstructed pixels associated with a picture from a media or a processor is shown in step 810, wherein the block of processed-reconstructed pixels are decoded from a video bitstream. SAO type index is determined from the video bitstream as shown in step 820, wherein the SAO type index is decoded according to truncated unary binarization, the SAO type index is decoded by CABAC with one context, or the SAO type index is decoded using CABAC with a context mode for a first bin associated with the SAO type index and with a bypass mode for any remaining bin associated with the SAO type index. After the SAO type index is determined, SAO processing is applied to the block of processed-reconstructed pixels based on SAO information including the SAO type index as shown in step 830.

The exemplary flowcharts shown in FIG. 5 through FIG. 8 are for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for Sample Adaptive Offset (SAO) processing of video data in a video decoder, the method comprising:
    receiving a block of processed-reconstructed pixels associated with a picture from a media or a processor, wherein the block of processed-reconstructed pixels are decoded from a video bitstream;
    determining a first SAO syntax element from the video bitstream, wherein the first SAO syntax element is decoded from the video bitstream using CABAC (context-based adaptive binary arithmetic coding) decoding,
    wherein the first SAO syntax element corresponds to a SAO merge left flag and at least one second syntax element corresponds to a SAO merge up flag,
    wherein the SAO merge left flag and the SAO merge up flag are associated with a first color component including one of a luma component and a chroma component, and
    wherein the SAO merge left flag shares a joint context model with the SAO merge up flag; and
    applying SAO processing to the block of processed-reconstructed pixels based on SAO information including the first SAO syntax element.

2. The method of claim 1, wherein the joint context model is derived based on joint statistics of the first SAO syntax element and said at least one second syntax element.

3. The method of claim 1, further comprising:
    determining a SAO type index by parsing a coded SAO type index in the video bitstream, wherein the coded SAO type index is encoded according to truncated unary binarization.

4. A method for Sample Adaptive Offset (SAO) processing of video data in a video encoder, the method comprising:
    receiving a block of processed-reconstructed pixels associated with a picture from a media or a processor;
    determining a first SAO syntax element for the block of processed-reconstructed pixels;
    applying CABAC (context-based adaptive binary arithmetic coding) encoding to the first SAO syntax element according to a joint context model,
    wherein the first SAO syntax element corresponds to a SAO merge left flag and at least one second syntax element corresponds to a SAO merge up flag,
    wherein the SAO merge left flag and the SAO merge up flag are associated with a first color component including one of a luma component and a chroma component, and
    wherein the SAO merge left flag shares the joint context model with the SAO merge up flag; and
    incorporating coded first SAO syntax element in a video bitstream associated with the video data.

5. The method of claim 4, wherein the joint context model is derived based on joint statistics of the first SAO syntax element and said at least one second syntax element.

6. The method of claim 4, further comprising:
    determining a SAO type index for the block of processed-reconstructed pixels; and
    incorporating a coded SAO type index in the video bitstream, wherein the coded SAO type index corresponds to the SAO type index being encoded according to truncated unary binarization.

7. An apparatus for Sample Adaptive Offset (SAO) processing of video data in a video decoder, the apparatus comprising:
    at least one circuit configured for:
        receiving a block of processed-reconstructed pixels associated with a picture from a media or a processor, wherein the block of processed-reconstructed pixels are decoded from a video bitstream;
        determining a first SAO syntax element from the video bitstream, wherein the first SAO syntax element is decoded from the video bitstream using CABAC (context-based adaptive binary arithmetic coding) decoding, wherein the first SAO syntax element corresponds to a SAO merge left flag and at least one second syntax element corresponds to a SAO merge up flag, wherein the SAO merge left flag and the SAO merge up flag are associated with a first color component including one of a luma component and a chroma component, and wherein the SAO merge left flag shares a joint context model with the SAO merge up flag; and applying SAO processing to the block of processed-reconstructed pixels based on SAO information including the first SAO syntax element.

8. An apparatus for Sample Adaptive Offset (SAO) processing of video data in a video encoder, the apparatus comprising:

at least one circuit configured for:

receiving a block of processed-reconstructed pixels associated with a picture from a media or a processor;

determining a first SAO syntax element for the block of processed-reconstructed pixels;

applying CABAC (context-based adaptive binary arithmetic coding) encoding to the first SAO syntax element according to a joint context model, wherein the first SAO syntax element corresponds to a SAO merge left flag and at least one second syntax element corresponds to a SAO merge up flag, wherein the SAO merge left flag and the SAO merge up flag are associated with a first color component including one of a luma component and a chroma component, and wherein the SAO merge left flag shares the joint context model with the SAO merge up flag; and incorporating coded first SAO syntax element in a video bitstream associated with the video data.

* * * * *